Aug. 18, 1942.   J. BRASSEUR   2,293,239
ASSEMBLY OF METALLIC ELEMENTS OR THE LIKE
Filed Nov. 16, 1939
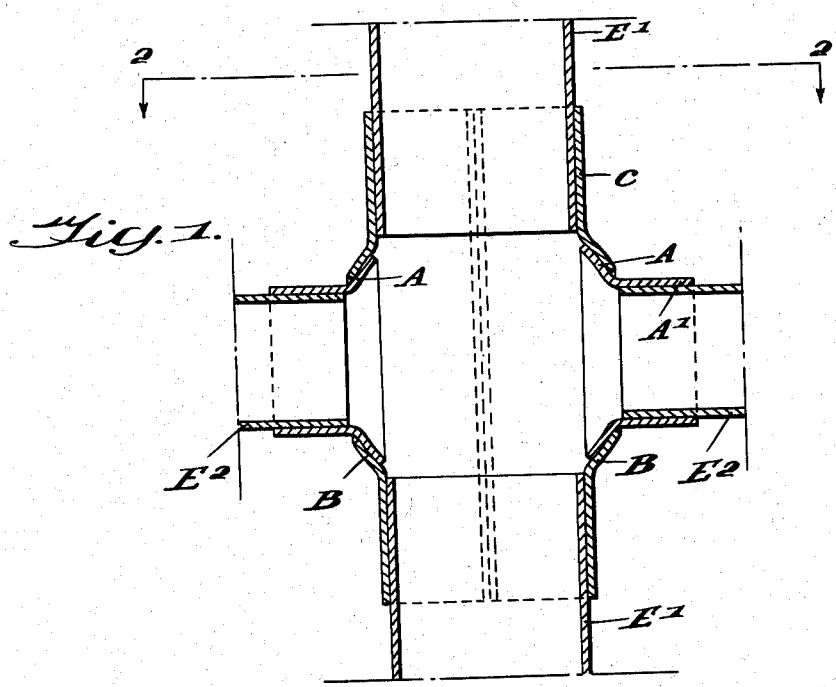
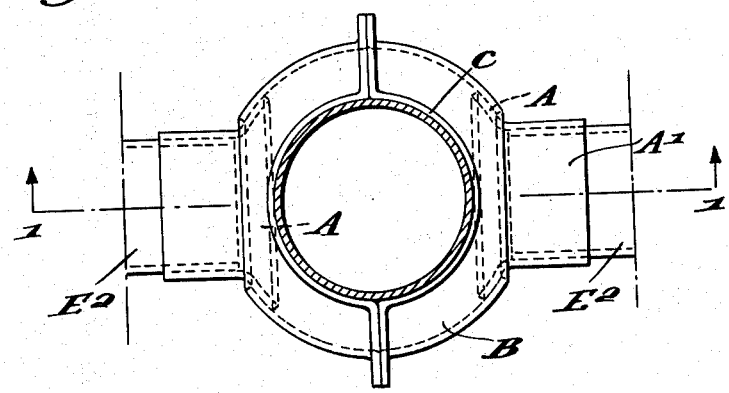
Inventor
Jacques Brasseur,
By Robert B. Larson
Attorney Patented Aug. 18, 1942

2,293,239

UNITED STATES PATENT OFFICE 2,293,239

ASSEMBLY OF METALLIC ELEMENTS OR THE LIKE

Jacques Brasseur, Asnieres, France, assignor to Société Bronzavia, Courbevoie, Seine, France, a society of France Application November 16, 1939, Serial No. 304,837
In France December 9, 1938

2 Claims. (Cl. 189—36)

The present invention relates to devices for the assembly of elements and it is more especially, although not exclusively, concerned with devices of this kind for the assembly of metallic elements, and in particular of metallic elements for the construction of aeronautic structures, such for instance as aircraft engine supports.

The devices of this type which were used up to the present time included rigid coupling parts to which the elements to be assembled were fixed, but the relative angular positions of said elements could not be varied, ever so little, once these elements had been fixed on the coupling parts. In particular, with devices of this type, it was impossible to remedy, when assembling the elements, through a suitable adjustment of the relative positioning of said elements to be assembled, slight errors in the dimensioning of said elements or of the coupling parts serving to hold them together.

The object of the present invention is to provide a device of the type above referred to which is better adapted to meet the requirements of actual practice than the prior devices used for this purpose, and, in particular, which obviates the disadvantage above pointed out.

According to an essential feature of the present invention, in order to constitute a device of the type above set forth, I make use of swivel coupling pieces the various portions of which can be fitted respectively on each of the elements to be assembled together, whereby it is possible to give said elements any desired relative angular positioning, before said portions of the coupling pieces are fixed relatively to one another by means of any suitable securing means.

Other features of the present invention will result from the following detailed description of some specific embodiments thereof.

Preferred embodiments of the present invention will be hereinafter described, with reference to the accompanying drawing, given merely by way of example, and in which:

Figure 1 is a section taken on the line I—I of Figure 2, and

Figure 2 is a plan view of one embodiment of the invention.

The invention relates to a device for the assembly of various elements (such for instance as frames, bracing tubes or bars, etc.) of a structure such for instance as a support for an aircraft engine or the like.

According to the chief feature of the present invention, I make use, for constituting these devices, of swivel couplings the elementary parts of which, to wit two annular parts A and B in the form of portions of a sphere, can be fitted respectively to each of the elements to be assembled together, whereby it is possible, when assembling the parts of the engine supporting structure, to give these elements a relative angular position which is best adapted to their proper assembly before securing these parts A and B together through any suitable means, such for instance as by welding.

Furthermore, if at least one of the elements to be assembled together is of tubular shape or in the form of a sectional iron, the portion (A for instance) of the coupling which is intended to be fitted on said element includes a kind of sleeve $A^1$ in which said element can be more or less engaged before being finally fixed to said sleeve, which makes it possible to adjust the relative position of the element in question in a direction parallel to its own axis.

The cup-shaped elements A and B of the coupling can be secured to the elements of the structure through any suitable means, for instance by means of rivets or by welding, and even, for instance, when the structure element includes a flat face, by directly forming one of the cup-shaped parts on said element, for instance by stamping.

It should be noted that the fact that the two coupling parts are constituted by spherical annular elements facilitates the application of electric welding in view of the fact that the welding electrodes can easily be engaged on either side of the elements to be assembled together, respectively.

With assembly devices made as above set forth, the mounting of the elements of the engine supporting structure can be carried out in two steps, to wit: a first step in the course of which said elements will be brought into suitable position owing to the provision of the swivel couplings and of the sliding couplings, and a second step in the course of which the coupling parts A and B will be fixed with respect to each other and with respect to the elements to assemble together.

It is also possible, in view of the above explanations, to provide many means of constituting the assembly parts.

When designing the swivel coupling means, it will be necessary to take into account the shapes and relative position of the elements to be assembled together and also the nature of the stresses that these elements are called upon to support.

The invention may be applied, for example, to a structural arrangement in which the elements to be assembled together are all of tubular shape, which makes it necessary to fit parts B with portions which are also of tubular general shape, for instance of cylindrical shape if the tube on which said parts B are to be fitted is itself of cylindrical shape.

For example, if it is desired to constitute a device adapted to permit of assembling together four tubes two of which, $E^1$, are arranged in line with each other, whereas the others, to wit $E^2$, may make a certain angle with the two first mentioned tubes, I may have recourse to the arrangement illustrated in the drawing.

In such arrangement, tubes $E^1$ are connected together by means of a cylindrical sleeve C made of two portions assembled together along a diametral plane. In the walls of said cylindrical sleeve elements I provide two annular spherical portions B, located at the places where tubes $E^2$ are to be mounted. Advantageously, these portions B have their common center on the axis of sleeve C.

I fit, on said tubes $E^2$, annular spherical parts A arranged to cooperate with said annular portions B.

Then the two portions which constitute sleeve C and the two swivel couplings made as above described are rigidly fixed together once the mounting has been completed.

Whatever be the particular embodiment that is chosen, I obtain, with the arrangement according to my invention, as above set forth, a device for the assembly of the elements of a structure, such in particular as an aircraft engine supporting structure, which has many advantages, and, in particular, the following:

It permits a quicker and better adjusted mounting of the structure;

It permits of utilizing the same coupling devices for various types of structures, in such manner that the relative angular position of the elements starting from a given coupling device can be modified at will.

Of course, the system above described can be utilized for the assembly of elements of a structure which are not metallic.

Also, the swivel coupling devices that are provided for constituting said devices are not necessarily rigidly fixed after the mounting, or the parts that constitute said devices may be fixed relatively to one another only in a temporary manner, for instance when it is desired to provide scaffoldings adapted to be readily taken to pieces.

In a general manner, while I have, in the above description, disclosed what I deem to be a practical and efficient embodiment of the present invention, it should be well understood that I do not wish to be limited thereto as there might be changes made in the arrangement, disposition and form of the parts without departing from the principle of the present invention as comprehended within the scope of the appended claims.

What I claim is:

1. A structural joint between two aligned tubular members comprising a cylindrical sleeve the end portions of which snugly fit the ends of the tubular members to be joined, at least one annular spherical blister in the wall of said sleeve, said blister having a central circular opening, a tubular member having an end disposed within the blister, said end having a spherical surface complementary to the inner wall of the blister, and a weld uniting the spherical surfaces together.

2. A structural joint between two aligned tubular members comprising a cylindrical sleeve the end portions of which snugly fit the ends of the tubular members to be joined, two oppositely disposed blisters in the wall of said sleeve, said blisters being provided with central circular openings having a common axis, two tubular members having an end disposed within a blister, said ends having spherical surfaces complementary to that of the inner walls of the blisters, said spherical surfaces having a common center on the axis of the aligned tubular members, and welds uniting the complementary spherical surfaces together.

JACQUES BRASSEUR.